(12) United States Patent
Chen et al.

(10) Patent No.: US 11,650,492 B2
(45) Date of Patent: May 16, 2023

(54) LIGHT UNIFORMING COMPONENT, LIGHTING MODULE, AND PROJECTOR

(71) Applicant: Coretronic Corporation, Hsin-Chu (TW)

(72) Inventors: Sung-Lien Chen, Hsin-Chu (TW); Chien-Chung Liao, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/578,391

(22) Filed: Jan. 18, 2022

(65) Prior Publication Data
US 2022/0236632 A1 Jul. 28, 2022

(30) Foreign Application Priority Data

Jan. 28, 2021 (CN) .......................... 202120236265.7

(51) Int. Cl.
*G03B 21/20* (2006.01)
(52) U.S. Cl.
CPC .................. *G03B 21/208* (2013.01)
(58) Field of Classification Search
None
See application file for complete search history.

(56) References Cited

U.S. PATENT DOCUMENTS

2007/0216871 A1* 9/2007 Yoshikawa ............ G03B 21/16
353/30

FOREIGN PATENT DOCUMENTS

CN 209117944 7/2019
CN 111427226 7/2020

* cited by examiner

*Primary Examiner* — Toan Ton
*Assistant Examiner* — Danell L Owens
(74) *Attorney, Agent, or Firm* — JCIPRNET (57) ABSTRACT

A light uniforming component including a light uniforming element and a frame is provided. The light uniforming element has a first side surface. The frame includes a side wall and a first elastic piece. The first elastic piece includes a first section and a second section. One end of the first section is bent and connected to the side wall. The second section is bent and connected to another end of the first section. The light uniforming element is disposed in the frame. A first fold line between the first section and the second section of the first elastic piece contacts the first side surface. A second fold line between the first section and the side wall is not perpendicular to an orthographic projection of an optical axis of the light uniforming element on the side wall. A lighting module and a projector including the light uniforming component are mentioned.

21 Claims, 9 Drawing Sheets

LIGHT UNIFORMING COMPONENT, LIGHTING MODULE, AND PROJECTOR

CROSS-REFERENCE TO RELATED APPLICATION

This application claims the priority benefit of China application serial no. 202120236265.7, filed on Jan. 28, 2021. The entirety of the above-mentioned patent application is hereby incorporated by reference herein and made a part of this specification.

BACKGROUND

Technical Field

The present invention relates to an optical component, and a lighting module and a projector including the optical component, and in particular to a light uniforming component, and a lighting module and a projector including the light uniforming component.

Description of Related Art

In a lighting module of a projector, a light integration rod is generally disposed in a frame. A side wall of the frame has an elastic piece adapted for fixing the light integration rod. The elastic piece has a fixed end connected to the frame and a free end extending from the frame towards the light integration rod. A fold line at the free end of the elastic piece abuts against a side surface of the light integration rod. In order to make effective use of light incident on the light integration rod, the side surface of the light integration rod is designed to be inclined to a side wall of the frame. In addition, a fold line at the fixed end of the elastic piece is generally designed to have an orthographic projection thereof on the side wall that is perpendicular to an orthographic projection of an optical axis of the light integration rod on the side wall. In this case, in order for the fold line at the free end of the elastic piece to evenly abut against the side surface of the light integration rod, the fold line of the elastic piece at the free end thereof needs to be designed to have an orthographic projection thereof on the side wall that is not perpendicular to the orthographic projection of the optical axis of the light integration rod on the side wall, so that the fold line at the free end is inclined to the side wall of the frame, too. Based on the disposition method as described above, in the process of installing the light integration rod into the frame, the fold line of the elastic piece is not perpendicular to a direction of movement of the light integration rod. Therefore, one of the ends of the fold line contacts the light integration rod first by a point contact method, which is similar to contacting a sharp point. The point contact is likely to cause the light integration rod to break.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The present invention provides a light uniforming component, a lighting module, and a projector, which may avoid the light uniforming element from breaking in a process of being installed into a frame.

Other objectives and advantages of the present invention may be further understood from the technical features disclosed in the present invention.

In order to achieve one or part or all of the above objectives or other objectives, an embodiment of the present invention proposes a light uniforming component, including a light uniforming element and a frame. The light uniforming element has a first side surface. The frame includes a side wall and a first elastic piece. The first elastic piece includes a first section and a second section. One end of the first section is bent and connected to the side wall. The second section is bent and connected to another end of the first section. The light uniforming element is disposed in the frame. A first fold line between the first section and the second section of the first elastic piece contacts the first side surface. A second fold line between the first section and the side wall is not perpendicular to an orthographic projection of an optical axis of the light uniforming element on the side wall.

In order to achieve one or part or all of the above objectives or other objectives, an embodiment of the present invention proposes a lighting module, including a light source and the light uniforming component as described above. The light source is configured to provide illumination light beam. The light uniforming component is disposed on a transmission path of the illumination light beam.

In order to achieve one or part or all of the above objectives or other objectives, an embodiment of the present invention proposes a projector, including the lighting module as described above, a light valve, and a lens. The lighting module includes a light source and the light uniforming component as described above. The light source is configured to provide an illumination light beam. The light valve is configured to convert the illumination light beam into an image light beam. The lens is configured to project the image beam.

Based on the above, the embodiments of the present invention at least have one of the following advantages or efficacies. In the light uniforming component of the present invention, the fold line (that is, the second fold line) at the fixed end (that is, the first section) of the first elastic piece is designed to have the orthographic projection thereof on the side wall that is not perpendicular to the orthographic projection of the optical axis of the light uniforming element on the side wall. Therefore, in the case where the fold line (that is, the first fold line) at the free end (that is, the second section) of the first elastic piece is perpendicular to the projection of the optical axis of the light uniforming element on the side wall, the first fold line is inclined to the side wall of the frame to evenly abut against the inclined side surface of the light uniforming element. In this way, it is not necessary to design the fold line (that is, the first fold line) at the free end of the first elastic piece to have the orthographic projection thereof on the side wall that is not perpendicular to the orthographic projection of the optical axis of the light uniforming element on the side wall in order to achieve the above objective. Therefore, in the process of installing the light uniforming element into the frame along the direction parallel to the optical axis, one of the ends of the fold line (that is, the first fold line) at the free end of the first elastic piece may be avoided from contacting the light uniforming element first by the point contact method. The point contact may cause the light uniforming element to break.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIG.(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to." Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
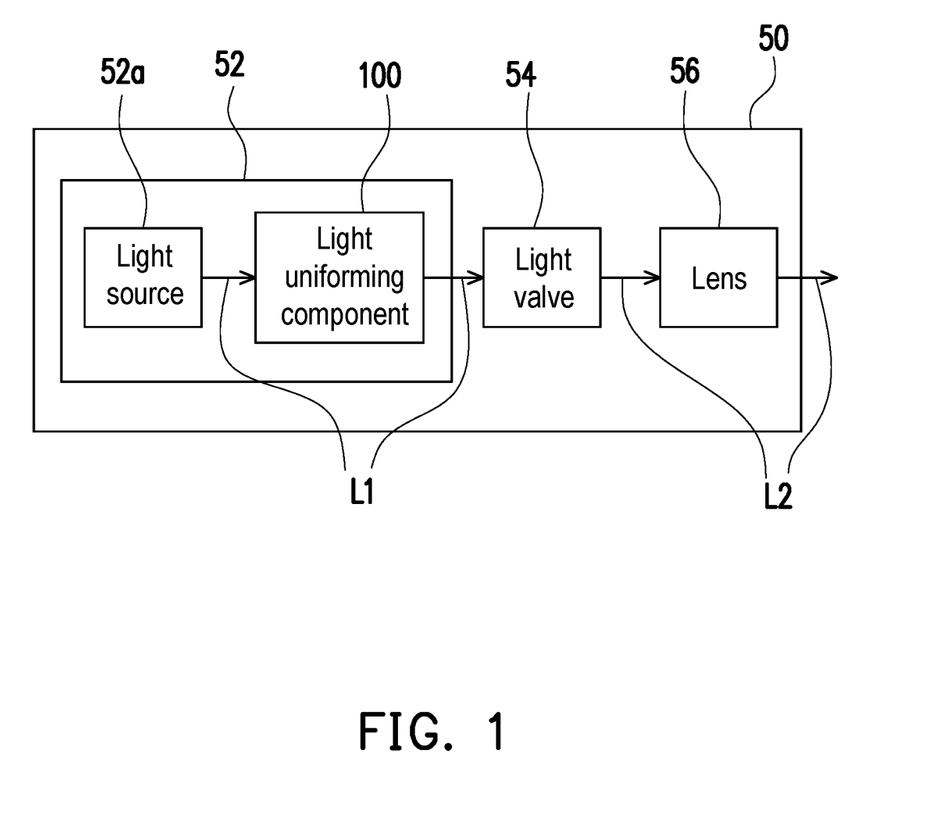
FIG. 1 is a schematic diagram of a projector according to an embodiment of the present invention.

FIG. 1 is a schematic diagram of a projector according to an embodiment of the present invention. Referring to FIG. 1, a projector 50 of this embodiment includes a lighting module 52, a light valve 54, and a lens 56. The lighting module 52 includes a light source 52a and a light uniforming component 100. The light source 52a is configured to provide an illumination light beam L1. The light uniforming component 100 is disposed on a transmission path of the illumination light beam L1. The light valve 54 is configured to convert the illumination light beam L1 into an image light beam L2. The lens 56 is configured to project the image beam L2 to the outside of the projector 50.

Figure 2:
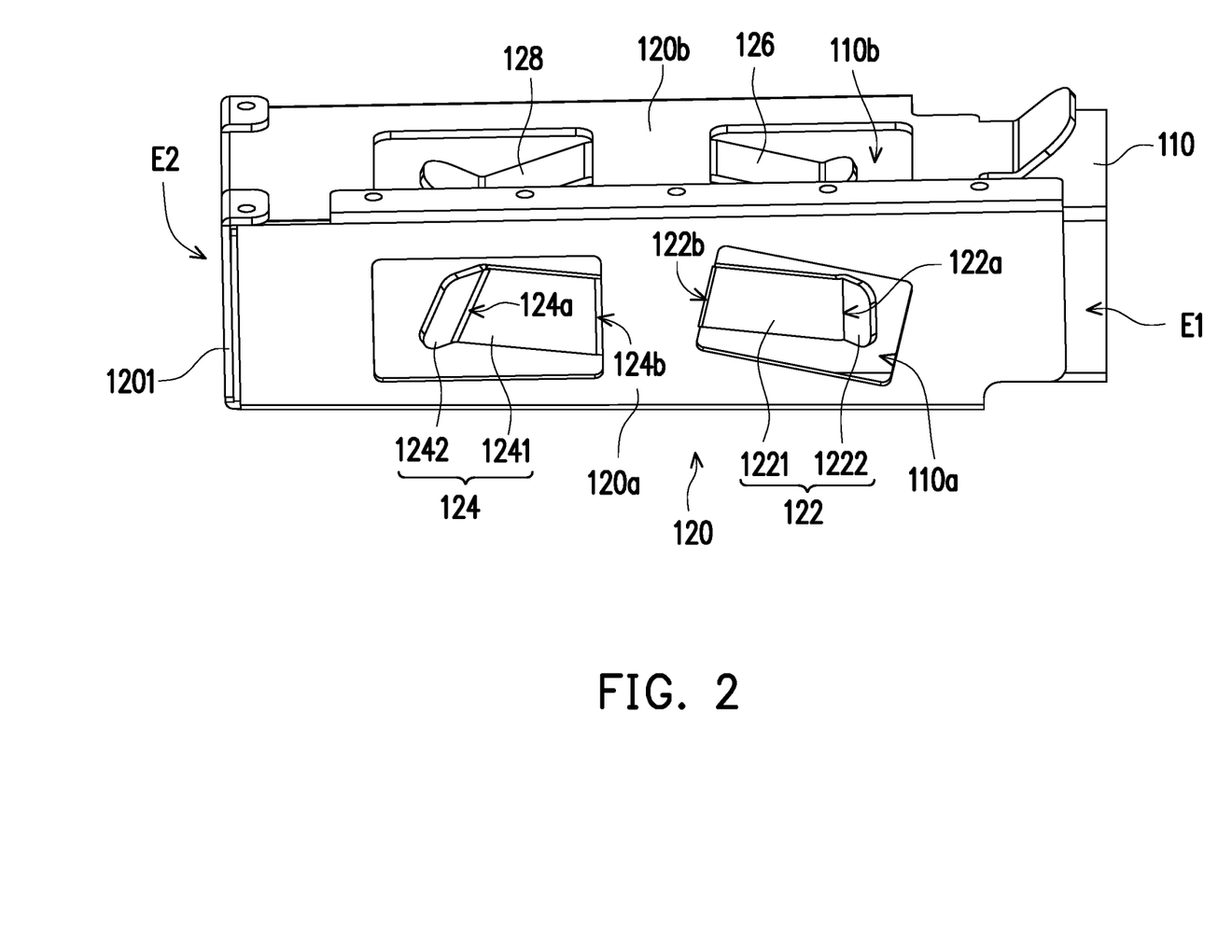
FIG. 2 is a perspective view of a light uniforming component of FIG. 1.
Figure 3:
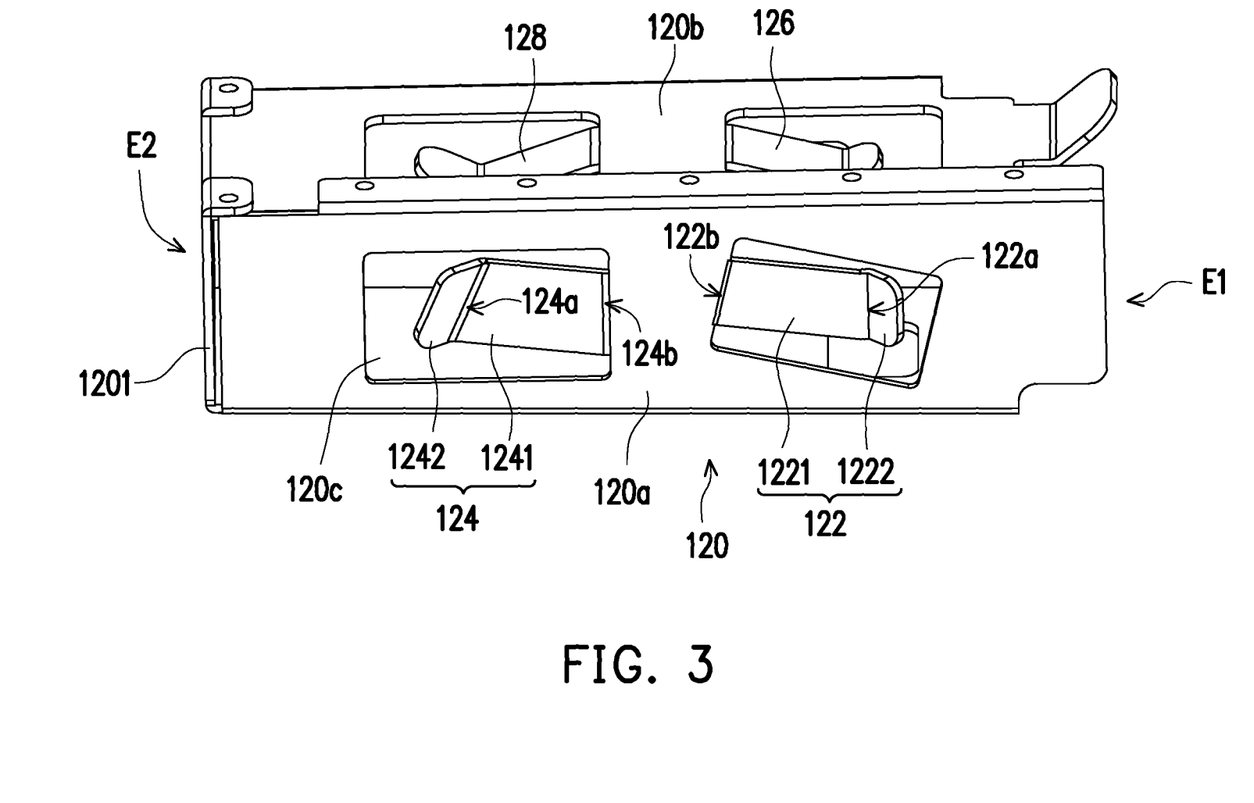
FIG. 3 is a perspective view of a frame of FIG. 2.
Figure 4:
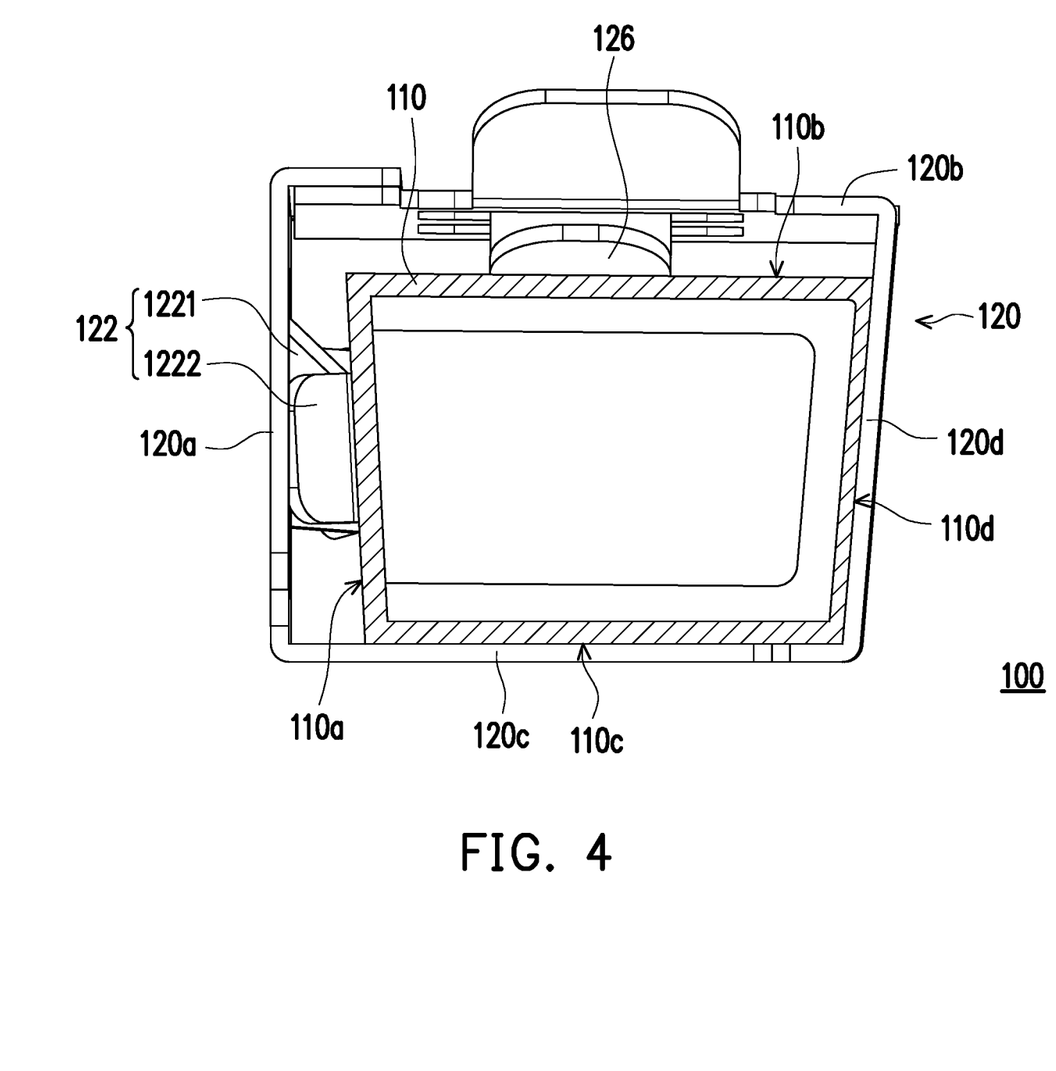
FIG. 4 is a front view of the light uniforming component of FIG. 2.

FIG. 2 is a perspective view of the light uniforming component of FIG. 1. FIG. 3 is a perspective view of a frame of FIG. 2. FIG. 4 is a front view of the light uniforming component of FIG. 2. To make the drawings clearer, a light uniforming element 110 in FIG. 4 is shown in cross-section, and a direction of the illumination light beam L1 incident on the light uniforming element 110 is along a direction perpendicular to the paper surface of FIG. 4 (that is, along an optical axis A) into the paper. Referring to FIGS. 2 to 4, the light uniforming component 100 of this embodiment includes the light uniforming element 110 and a frame 120. The light uniforming element 110 has a first side surface 110a, a second side surface 110b, a third side surface 110c, and a fourth side surface 110d. The second side surface 110b and the third side surface 110c are parallel to each other. The first side surface 110a is connected between the second side surface 110b and the third side surface 110c and is not perpendicular to the second side surface 110b and the third side surface 110c. The fourth side surface 110d is connected between the second side surface 110b and the third side surface 110c and is not perpendicular to the second side surface 110b and the third side surface 110c.

The frame 120 includes side walls 120a to 120d, a first elastic piece 122, a second elastic piece 124, a third elastic piece 126, and a fourth elastic piece 128. The light uniforming element 110 is disposed in the frame 120. The third side surface 110c and the fourth side surface 110d of the light uniforming element 110 respectively abut against the side walls 120c and 120d of the frame 120. The first elastic piece 122 and the second elastic piece 124 abut against the first side surface 110a of the light uniforming element 110. The third elastic piece 126 and the fourth elastic piece 128 abut against the second side surface 110b of the light uniforming element 110.

Figure 5:
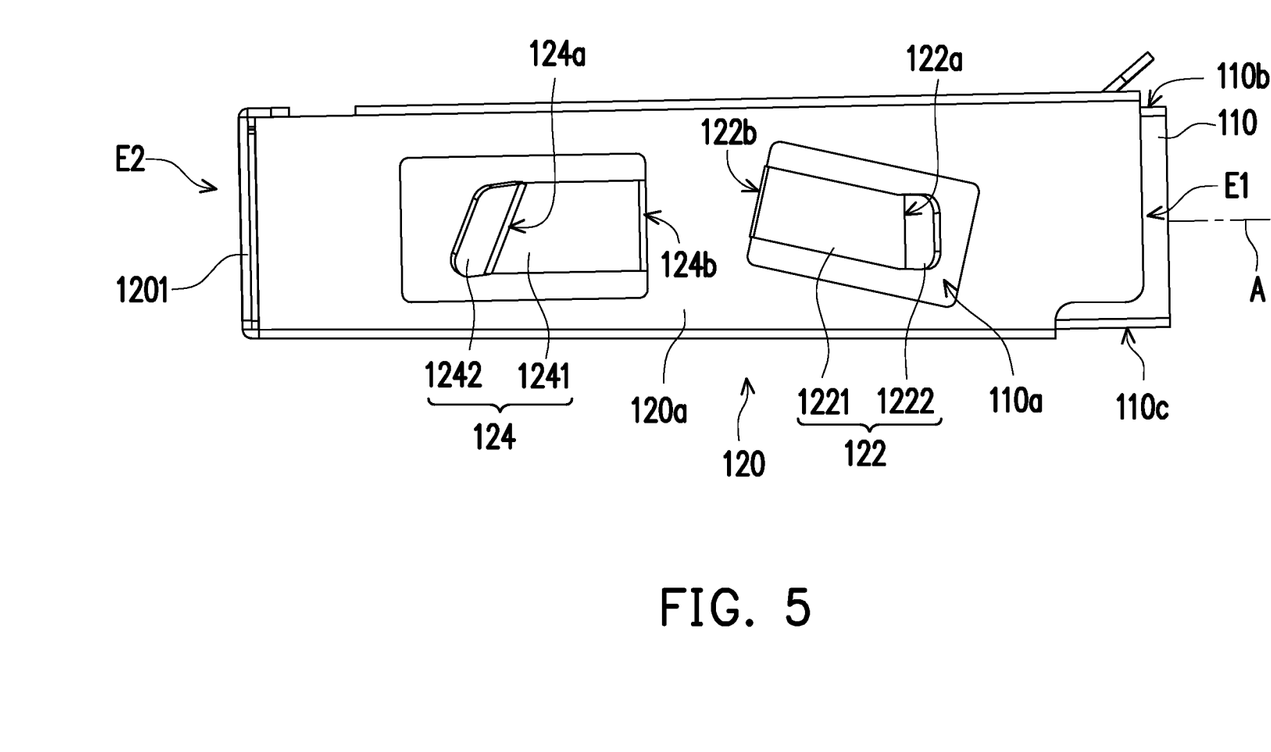
FIG. 5 is a side view of the light uniforming component of FIG. 1.

FIG. 5 is a side view of the light uniforming component of FIG. 1. Referring to FIGS. 1 and 5. The first elastic piece 122 of this embodiment is located between a first port E1 and the second elastic piece 124 of the frame 120 and includes a first section 1221 and a second section 1222. One end of the first section 1221 is bent and connected to the side wall 120a. The second section 1222 is bent and connected to another end of the first section 1221. The second section 1222 is located between the first port E1 and the first section 1221. A first fold line 122a between the first section 1221 and the second section 1222 of the first elastic piece 122 is in line contact with the first side surface 110a of the light uniforming element 110. As shown in FIG. 5, a second fold line 122b between the first section 1221 and the side wall 120a is not perpendicular to an orthographic projection of the optical axis A of the light uniforming element 110 on the side wall 120a. Therefore, in the case where the first fold line 122a between the first section 1221 and the second section 1222 is perpendicular to the orthographic projection of the optical axis A on the side wall 120a, the first fold line 122a is inclined to the side wall 120a of the frame 120 and may evenly abut against the inclined side surface (the first side surface 110a) of the light uniforming element 110. In this way, the objective described above may be achieved, and the first fold line 122a of the first elastic piece 122 may be avoided from being designed to have an orthographic projection thereof on the side wall 120a that is not perpendicular to the orthographic projection of the optical axis A on the side wall 120a.

In addition, an orthographic projection of the first section 1221 in an extending direction from the side wall 120a to the first side surface 110a on the side wall 120a is not parallel to the orthographic projection of the optical axis A on the side wall 120a.

Figure 6A:
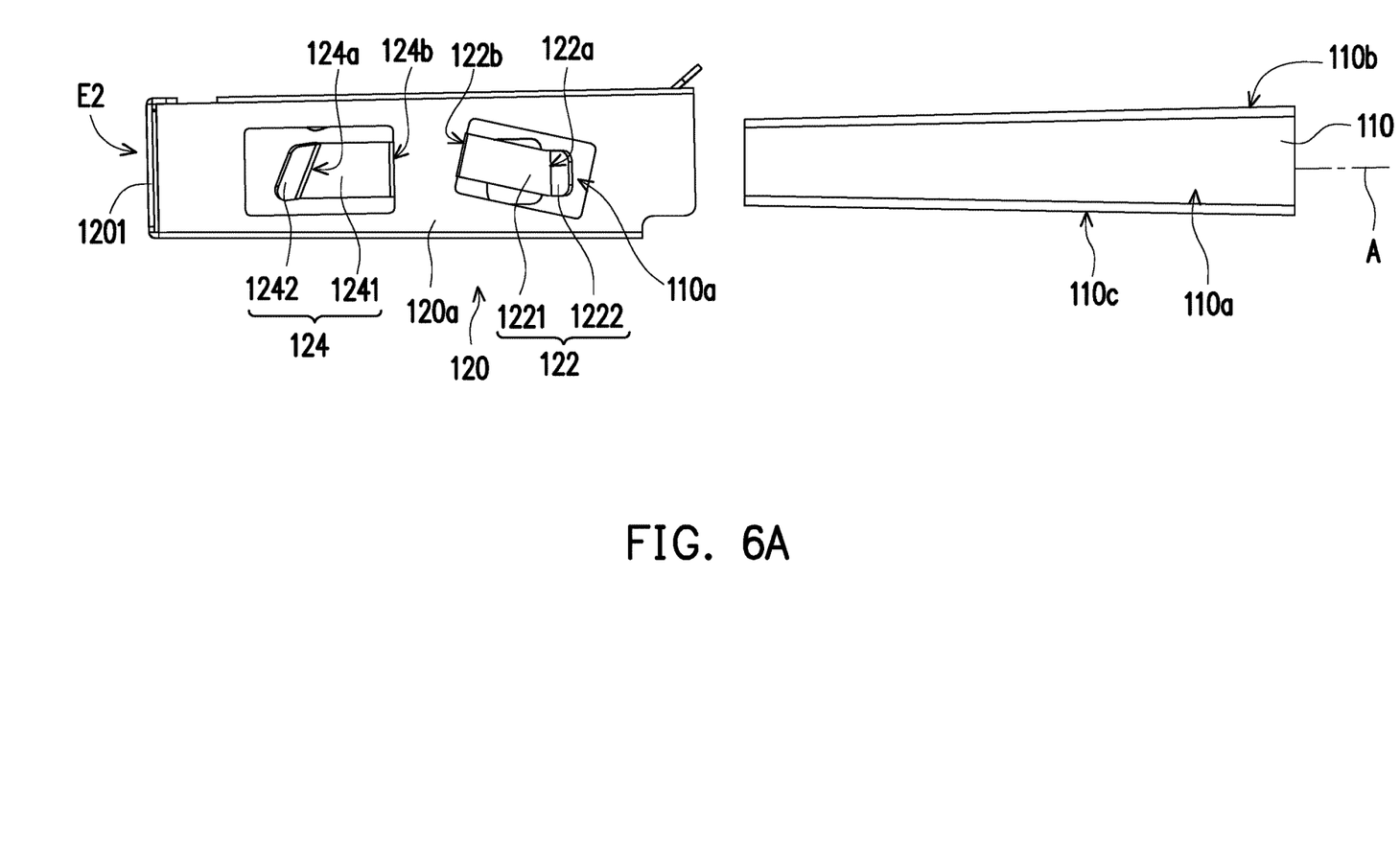
FIGS. 6A and 6B illustrate an assembly process of the light uniforming component of FIG. 5.
Figure 6B:
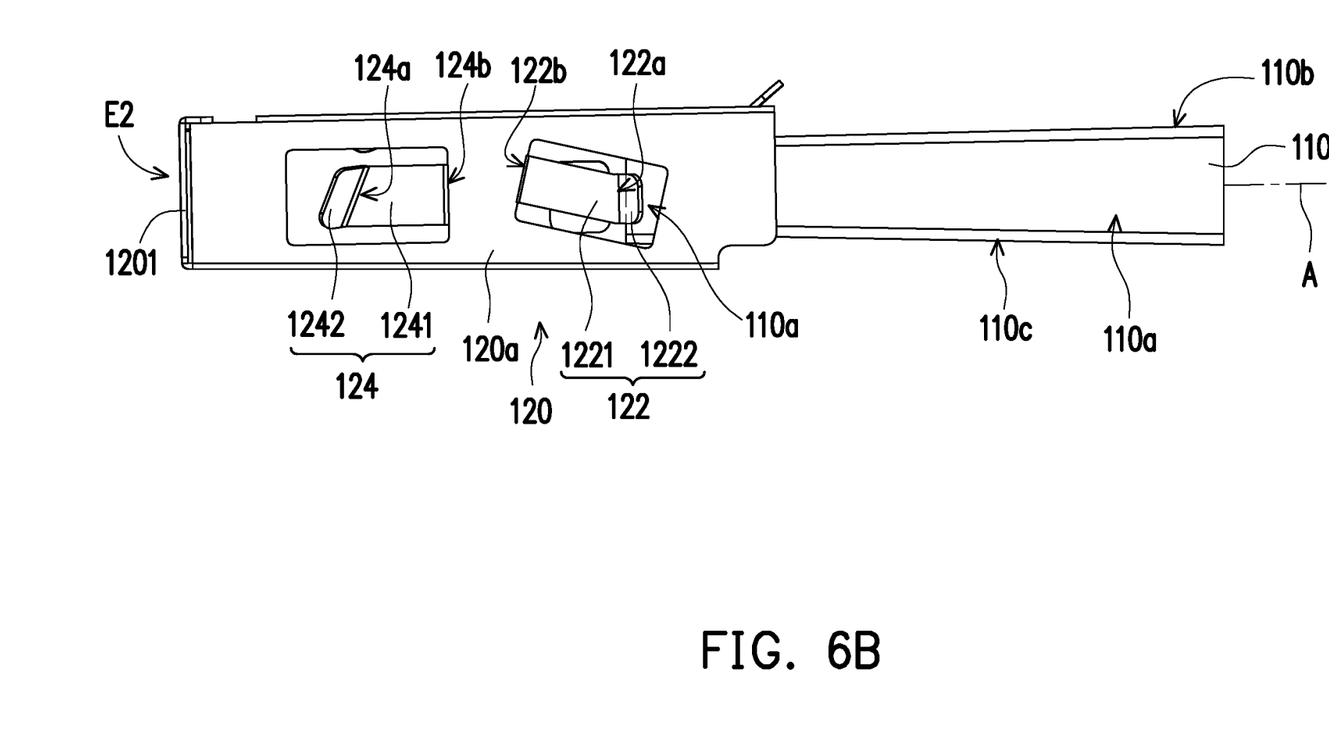

FIGS. 6A and 6B illustrate an assembly process of the light uniforming component of FIG. 5. Since the first fold line 122a may be disposed as being perpendicular to the orthographic projection of the optical axis A on the side wall 120a as described above, during a process of installing the light uniforming element 110 into the frame 120 from the first port E1 of the frame 120 along a direction parallel to the optical axis A as shown in FIGS. 6A to 6B, the entire first fold line 122a contacts an inclined side surface of the light uniforming element 110 as shown in FIG. 6B. Accordingly, one of the ends of the first fold line 122a may be prevented from contacting the light uniforming element 110 first by a point contact method. The point contact may cause the inclined side surface of the light uniforming element 110 to break.

Figure 7:
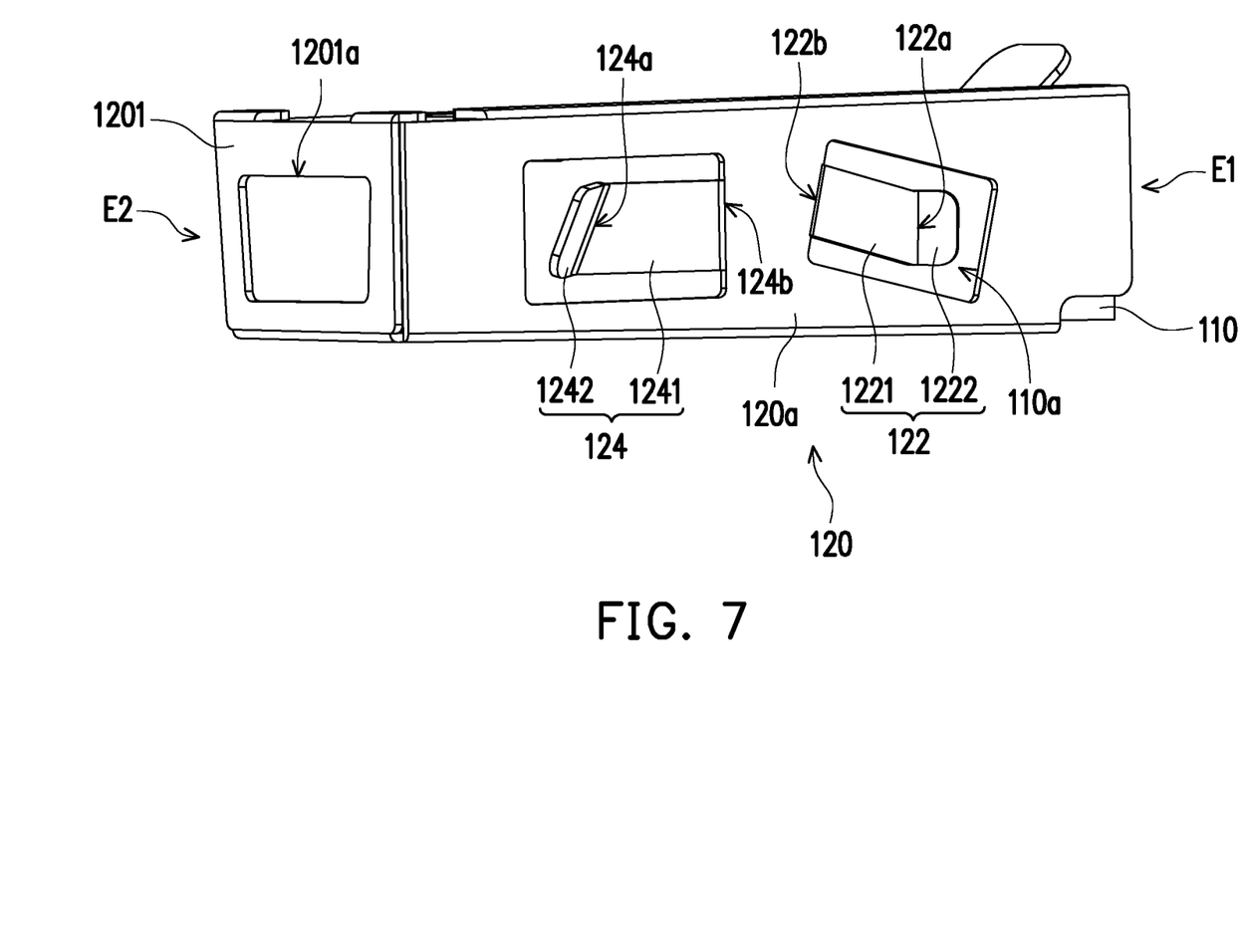
FIG. 7 is a perspective view of the light uniforming component of FIG. 2 from another angle of view.

FIG. 7 is a perspective view of the light uniforming component of FIG. 2 from another angle of view. Referring to FIG. 7, in this embodiment, the frame 120 has a second port E2 relative to the first port E1 and includes a cap plate 1201. The cap plate 1201 contacts the side walls 120a to 120d. The cap plate 1201 has an opening so that light passing through the second port E2 is blocked by part and penetrates the cap plate 1201 by part. One end of the light uniforming element 110 abuts against the cap plate 1201. An opening 1201a of cap plate 1201 may allow light to pass through.

Referring to FIG. 5, the second elastic piece 124 of this embodiment includes a third section 1241 and a fourth section 1242. One end of the third section 1241 is bent and connected to the side wall 120a. The fourth section 1242 is bent and connected to another end of the third section 1241. A third fold line 124a between the third section 1241 and the fourth section 1242 of the second elastic piece 124 contacts the first side surface 110a of the light uniforming element 110. The third section 1241 is located between the third fold line 124a and the first elastic piece 122.

In this embodiment, since the second elastic piece 124 does not face the first port E1 like the first elastic piece 122, and the first elastic piece 122 has exerted force on the inclined side surface of the light uniforming element 110 to partially achieve an alignment, the problem brought by the second elastic piece 124 contacting the light uniforming element 110 first by the point contact method and the point contact causing the light uniforming element 110 to break may be less significant. Therefore, as shown in FIG. 5, a fourth fold line 124b between the third section 1241 of the second elastic piece 124 and the side wall 120a may be perpendicular to the orthographic projection of the optical axis A on the side wall 120a, and the third fold line 124a between the third section 1241 and the fourth section 1242 of the second elastic piece 124 may be not parallel to the first fold line 122a between the first section 1221 and the second section 1222 of the first elastic piece 122. However, the present invention is not limited thereto, and another example is illustrated in the following with a drawing.

Figure 8:
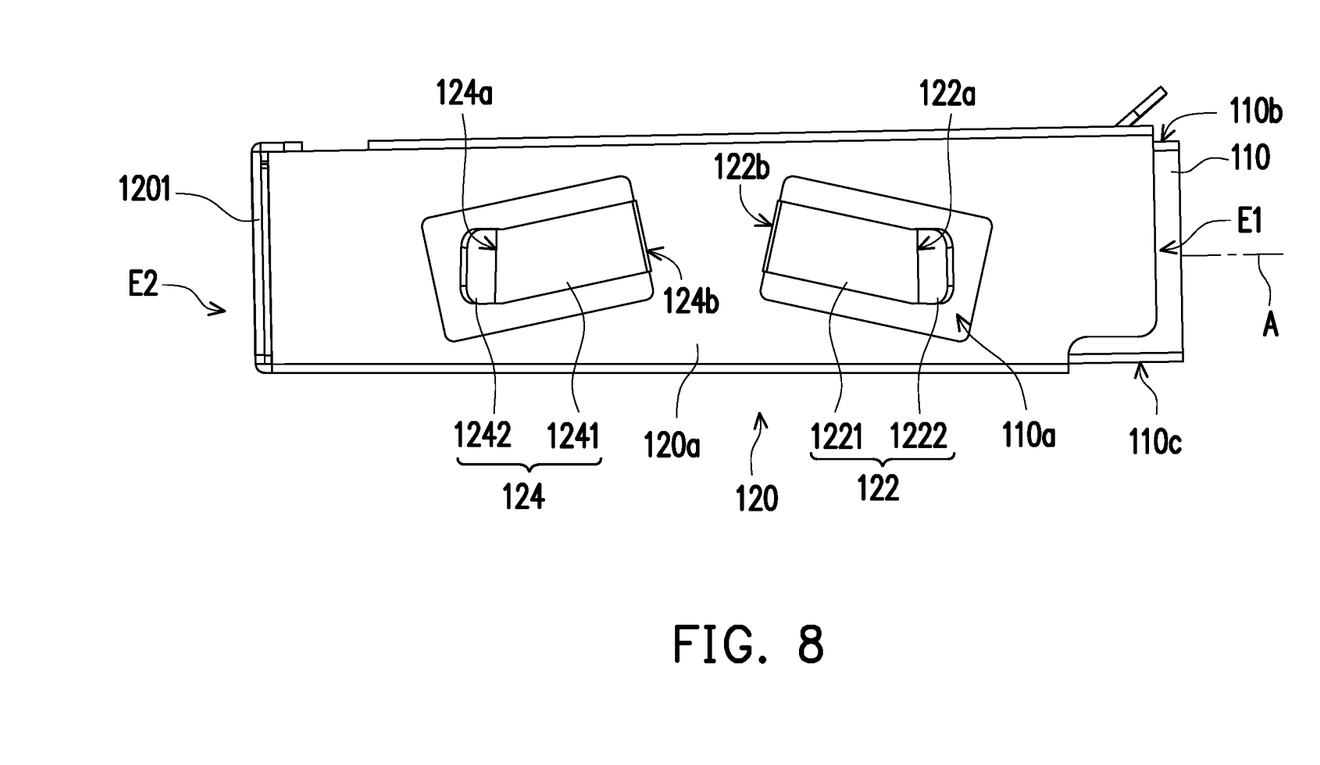
FIG. 8 is a side view of a light uniforming component according to another embodiment of the present invention.

FIG. 8 is a side view of a light uniforming component according to another embodiment of the present invention. The differences between the embodiment shown in FIG. 8 is different from the embodiment shown in FIG. 5 are as follows. The fourth fold line 124b between the third section 1241 of the second elastic piece 124 and the side wall 120a in FIG. 8 is not perpendicular to the orthographic projection of the optical axis A on the side wall 120a. The third fold line 124a between the third section 1241 and the fourth section 1242 of the second elastic piece 124 is parallel to the first fold line 122a between the first section 1221 and the second section 1222 of the first elastic piece 122.

In addition, an orthographic projection of an extending direction of the third section 1241 from the side wall 120a to the first side surface 110a on the side wall 120a is not parallel to the orthographic projection of the optical axis A on the side wall 120a.

In another embodiment, the third fold line 124a of the second elastic piece 124 is located between the third section 1241 and the first elastic piece 122. In yet another embodiment, a first section of the first elastic piece 122 is located between the first port E1 and the first fold line 122a, and the third fold line 124a of the second elastic piece 124 is located between the third section 1241 and the first elastic piece 122.

According to the design method as described above, disposing the second elastic piece 124 to not face the first port E1 or to face the first port E1 may both prevent the third fold line 124a of the second elastic piece 124 from contacting the light uniforming element 110 first by the point contact method. The point contact may cause the light uniforming element 110 to break.

In summary, the embodiments of the present invention at least have one of the following advantages or efficacies. In the light uniforming component of the present invention, the fold line (that is, the second fold line) at the fixed end of the first elastic piece is designed to have the orthographic projection thereof on the side wall that is not perpendicular to the orthographic projection of the optical axis of the light uniforming element on the side wall. Therefore, in the case where the fold line (that is, the first fold line) at the free end of the first elastic piece is perpendicular to the projection of the optical axis of the light uniforming element on the side wall, the first fold line is inclined to the side wall of the frame to evenly abut against the inclined side surface of the light uniforming element. In this way, it is not necessary to design the fold line (that is, the first fold line) at the free end of the first elastic piece to have the orthographic projection thereof on the side wall that is not perpendicular to the orthographic projection of the optical axis of the light uniforming element on the side wall in order to achieve the above objective. Therefore, in the process of installing the light uniforming element into the frame along the direction parallel to the optical axis, one of the ends of the fold line (that is, the first fold line) at the free end of the first elastic piece may be avoided from contacting the light uniforming element first by the point contact method. The point contact may cause the light uniforming element to break.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light uniforming component, comprising a light uniforming element and a frame, wherein:
   the light uniforming element has a first side surface; and
   the frame comprises a side wall and a first elastic piece, wherein the first elastic piece comprises a first section and a second section, one end of the first section is bent and connected to the side wall, the second section is bent and connected to another end of the first section, the light uniforming element is disposed in the frame, a first fold line between the first section and the second section of the first elastic piece contacts the first side surface, and a second fold line between the first section and the side wall is not perpendicular to an orthographic projection of an optical axis of the light uniforming element on the side wall.

2. The light uniforming component according to claim 1, wherein the first fold line between the first section and the second section is perpendicular to the orthographic projection the optical axis of the light uniforming element on the side wall.

3. The light uniforming component according to claim 1, wherein the frame has a first port, and the light uniforming element is configured to be placed into the frame from the first port along a direction parallel to the optical axis.

4. The light uniforming component according to claim 3, comprising a second elastic piece, wherein the first elastic piece is located between the first port and the second elastic piece, the second elastic piece comprises a third section and a fourth section, one end of the third section is bent and connected to the side wall, the fourth section is bent and connected to another end of the third section, and a third fold line between the third section and the fourth section of the second elastic piece contacts the first side surface.

5. The light uniforming component according to claim 4, wherein a fourth fold line between the third section and the side wall is perpendicular to the orthographic projection of the optical axis of the light uniforming element on the side wall, and the third fold line between the third section and the fourth section is not parallel to the first fold line between the first section and the second section.

6. The light uniforming component according to claim 3, wherein the frame has a second port relative to the first port and comprises a cap plate, the cap plate shields a part of the second port, and one end of the light uniforming element abuts against the cap plate.

7. The light uniforming component according to claim 1, wherein the light uniforming element has a second side surface and a third side surface parallel to each other, and the first side surface is connected between the second side surface and the third side surface and is not perpendicular to the second side surface and the third side surface.

8. A lighting module, comprising a light source and a light uniforming component, wherein:
   the light source is configured to provide an illumination light beam; and
   the light uniforming component is disposed on a transmission path of the illumination light beam, and the light uniforming component comprises a light uniforming element and a frame, wherein:
   the light uniforming element has a first side surface; and
   the frame comprises a side wall and a first elastic piece, wherein the first elastic piece comprises a first section and a second section, one end of the first section is bent and connected to the side wall, the second section is bent and connected to another end of the first section, the light uniforming element is disposed in the frame, a first fold line between the first section and the second section of the first elastic piece contacts the first side surface, and a second fold line between the first section and the side wall is not perpendicular to an orthographic projection of an optical axis of the light uniforming element on the side wall.

9. The lighting module according to claim 8, wherein the first fold line between the first section and the second section is perpendicular to the orthographic projection of the optical axis of the light uniforming element on the side wall.

10. The lighting module according to claim 8, wherein the frame has a first port, and the light uniforming element is configured to be placed into the frame from the first port along a direction parallel to the optical axis.

11. The lighting module according to claim 10, wherein the light uniforming component comprises a second elastic piece, the first elastic piece is located between the first port and the second elastic piece, the second elastic piece comprises a third section and a fourth section, one end of the third section is bent and connected to the side wall, the fourth section is bent and connected to another end of the third section, and a third fold line between the third section and the fourth section of the second elastic piece contacts the first side surface.

12. The lighting module according to claim 11, wherein a fourth fold line between the third section and the side wall is perpendicular to the orthographic projection of the optical axis of the light uniforming element on the side wall, and the third fold line between the third section and the fourth section is not parallel to the first fold line between the first section and the second section.

13. The lighting module according to claim 10, wherein the frame has a second port relative to the first port and comprises a cap plate, the cap plate shields a part of the second port, and one end of the light uniforming element abuts against the cap plate.

14. The lighting module according to claim 8, wherein the light uniforming element has a second side surface and a third side surface parallel to each other, and the first side surface is connected between the second side surface and the third side surface and is not perpendicular to the second side surface and the third side surface.

15. A projector, comprising a lighting module, a light valve, and a lens, wherein:
the lighting module comprises a light source and a light uniforming component, wherein:
the light source is configured to provide an illumination light beam; and
the light uniforming component is disposed on a transmission path of the illumination light beam, and the light uniforming component comprises a light uniforming element and a frame, wherein:
the light uniforming element has a first side surface; and
the frame comprises a side wall and a first elastic piece, wherein the first elastic piece comprises a first section and a second section, one end of the first section is bent and connected to the side wall, the second section is bent and connected to another end of the first section, the light uniforming element is disposed in the frame, a first fold line between the first section and the second section of the first elastic piece contacts the first side surface, and a second fold line between the first section and the side wall is not perpendicular to an orthographic projection of an optical axis of the light uniforming element on the side wall;
the light valve is configured to convert the illumination light beam into an image light beam; and
the lens is configured to project the image light beam.

16. The projector according to claim 15, wherein the first fold line between the first section and the second section is perpendicular to the orthographic projection of the optical axis of the light uniforming element on the side wall.

17. The projector according to claim 15, wherein the frame has a first port, and the light uniforming element is configured to be placed into the frame from the first port along a direction parallel to the optical axis.

18. The projector according to claim 17, wherein the light uniforming component comprises a second elastic piece, the first elastic piece is located between the first port and the second elastic piece, the second elastic piece comprises a third section and a fourth section, one end of the third section is bent and connected to the side wall, the fourth section is bent and connected to another end of the third section, and a third fold line between the third section and the fourth section of the second elastic piece contacts the first side surface.

19. The projector according to claim 18, wherein a fourth fold line between the third section and the side wall is perpendicular to the orthographic projection of the optical axis of the light uniforming element on the side wall, and the third fold line between the third section and the fourth section is not parallel to the first fold line between the first section and the second section.

20. The projector according to claim 17, wherein the frame has a second port relative to the first port and comprises a cap plate, the cap plate shields a part of the second port, and one end of the light uniforming element abuts against the cap plate.

21. The projector according to claim 15, wherein the light uniforming element has a second side surface and a third side surface parallel to each other, and the first side surface is connected between the second side surface and the third side surface and is not perpendicular to the second side surface and the third side surface.

* * * * *